(12) United States Patent
Leung et al.

(10) Patent No.: US 6,514,421 B2
(45) Date of Patent: Feb. 4, 2003

(54) METHOD FOR SEPARATING A LIQUID-SOLID SLURRY

(75) Inventors: Wallace Woon Fong Leung, Sherborn, MA (US); Nicholas R. Frohlich, Jr., Cincinnati, OH (US)

(73) Assignee: Baker Hughes, Inc., Salt Lake City, UT (US)

( * ) Notice: Subject to any disclaimer, the term of this patent is extended or adjusted under 35 U.S.C. 154(b) by 0 days.

(21) Appl. No.: 09/900,261

(22) Filed: Jul. 6, 2001

(65) Prior Publication Data

US 2002/0030024 A1 Mar. 14, 2002

Related U.S. Application Data

(63) Continuation of application No. 09/646,504, filed on Jul. 14, 2000, now Pat. No. 6,267,250, which is a continuation of application No. 09/090,652, filed on Jun. 4, 1998, now Pat. No. 6,109,452.

(51) Int. Cl.[7] .................................................. B04B 3/00
(52) U.S. Cl. ........................ 210/781; 210/787; 210/369; 494/36; 494/37
(58) Field of Search ................................ 210/781, 787, 210/369, 380.1, 380.3; 494/36.37

(56) References Cited

U.S. PATENT DOCUMENTS

| 4,922,625 A | 5/1990 | Farmer |
| 5,378,364 A | 1/1995 | Welling |
| 5,380,266 A | 1/1995 | Leung et al. |
| 5,397,471 A | * 3/1995 | Rodebush et al. ....... 210/360.1 |
| 5,616,245 A | 4/1997 | Albrecht |

OTHER PUBLICATIONS

Bird Wemco Centrifuges pamphlet (date unknown).

Bird Wemco Scroll/Screen Centrifuges, Models H–900 and H–1000 pamphlet (copyright 1996).

Bird Centrifuges for Coal Preparation pamphlet (copyright 1996).

* cited by examiner

Primary Examiner—David A. Reifsnyder
(74) Attorney, Agent, or Firm—Cesari and McKenna, LLP; Michael R. Reinemann (57) ABSTRACT

An improved screen basket for use with a centrifuge includes two adjoining screen sections. The first screen section is formed from a wear resistant material and is located proximate to the point at which slurry is introduced into the basket. The length of the first screen section is chosen so that the majority of potential wear caused by the abrasive slurry occurs within the first section of the basket. The second screen section is preferably formed from less expensive materials, such as steel wedge wire. The second screen section smoothly joins the first screen section and provides for further dewatering or separation of the accelerated slurry so that a dry cake is produced by the centrifuge.

26 Claims, 9 Drawing Sheets

DIRECTION OF ROTATION

METHOD FOR SEPARATING A LIQUID-SOLID SLURRY

This application is a continuation of appl. Ser. No. 09/646,504, filed Jul. 14, 2000, now U.S. Pat. No. 6,267,250 which is a continuation of appl. Ser. No. 09/090,652, filed Jun. 4, 1998, now U.S. Pat. No. 6,109,452.

FIELD OF THE INVENTION

The present invention relates generally to separating centrifuges, and more specifically, to an improved screen basket for use in separating centrifuges.

BACKGROUND OF THE INVENTION

Centrifuges, such as screen scroll centrifuges, are often used to filter or dewater crystalline or amorphous solid/liquid slurries. These centrifuges typically utilize a screen to separate the solid portion of the slurry from the liquid phase. The screen, moreover, is typically sized to retain the larger solids portion of the slurry while allowing the liquid to pass through and thus the two phases of the slurry may be separately collected. Instead of relying on Earth's gravity to filter the slurry through the screen, however, filtration occurs under large centrifugal forces (on the order of many times the force of gravity), caused by high rotational speed of the centrifuge. These large centrifugal forces substantially increase the separation efficiency of the centrifuge.

Specifically, the slurry is delivered to the interior of a rotating basket that includes a conical screen portion. The conical screen portion is typically formed from a plurality of wire segments that are spaced side-by-side. For structural support, the wire segments may be welded to circumferential ribs spaced out along the axis of the basket. Rotation of the cone-shaped basket drives the slurry against the inner surface of the basket and the liquid phase is forced through the slots formed between adjacent wire segments. The larger solid particles do not pass through the slots and are instead collected on the inside of the basket.

To convey the solids out of the inside of the basket, a scroll conveyor having a helical blade is typically mounted concentrically within the basket. The tip of the blade, moreover, is spaced from the inner surface of the basket by a small radial clearance. The scroll conveyor is rotated in the same direction as the basket but at a slightly different rotational speed relative to the basket. Through this differential speed, the solids accumulating along the inside surface of the basket are conveyed by the helical blade from the small diameter end toward the basket's larger end where they are dumped in a discharge chute and collected.

Another type of separating centrifuge is a vibrating centrifuge. Vibrating centrifuges also include a screen basket that is similar in design to the basket of screen scroll centrifuges. A vibrating centrifuge, however, does not utilize a helically bladed scroll to move the solid particles collecting on the inside surface of the basket to the discharge chute. Instead, the vibrating centrifuge includes a mechanism for shaking the basket back-and-forth along its axis. By shaking or vibrating the basket along its axis, solid particles accumulating on the inside of the basket are conveyed axially toward the discharge chute and collected.

As shown, scroll and vibrating centrifuge are very useful for separating liquid/solid slurries. Nonetheless, these centrifuges are subject to significant wear requiring frequent maintenance and corresponding down time. For example, solid particles of the slurry often get trapped in the slots of the basket, damaging the screen and reducing the separation efficiency of the centrifuge. Furthermore, the slurries often include highly abrasive components that wear out the screen portion of the basket. The corresponding maintenance and replacement of parts significantly increase operating costs.

An improvement to the conventional screen basket is described in U.S. Pat. No. 5,378,364 commonly owned by the assignee of the present application. In the '364 patent, the conventional wedge wire basket is replaced with a wear resistant basket. In particular, the basket includes an outer structure having a plurality of closely spaced apertures or windows. Bridging each aperture or window are a plurality of wear resistant ligaments arranged to form screen sections. The ligaments may be formed from tungsten carbide which has improved wear characteristics as compared to the more conventional wedge wire. The tungsten carbide ligaments are typically spaced side-by-side inside the basket. The spaces between adjacent ligaments form slots through which the liquid portion of a slurry passes. The configuration and arrangement of the ligaments, moreover, reduce the chances of entrapment of solid particles in the slots.

Although the wear resistant basket of the '364 patent presents a significant improvement in scroll centrifuges, it is nevertheless costly to manufacture. Specifically, as set forth above, the screen elements of the wear resistant basket are typically formed from tungsten carbide ligaments and extend the full length of the basket. Since tungsten carbide is a relatively expensive material, the cost of manufacturing such baskets is high. In addition, the ligaments are typically installed within the basket by hand further increasing the manufacturing costs of such baskets. Thus, it is desirable to develop a screen basket having wear resistant features but at a lower cost.

SUMMARY OF THE INVENTION

It is an object of the present invention to provide a screen basket for use in a centrifuge having improved wear-resistant characteristics.

It is a further object of the present invention to provide a centrifuge that is less costly to manufacture and operate than prior designs, while still having high wear resistant characteristics.

Briefly, the invention relates to an improved screen basket rotatably mounted within a centrifuge. The basket is preferably formed in the shape of a truncated cone and includes a small diameter segment and a large diameter segment. The basket also has two screen sections. In particular, the basket includes a first screen section formed from a wear resistant material. The first section is located at the small diameter segment of the basket proximate to the introduction point of slurry to the basket. A second screen section is located at the large diameter segment of the basket and is preferably formed from less expensive materials, such as steel or stainless steel wedge or profiled wires. The inner surfaces of the two sections are smoothly joined together so as to form a single continuous screen basket.

In a preferred embodiment, the first screen section preferably takes up approximately one-third of the length of the basket and the second screen section comprises the remaining two-thirds. Furthermore, the slots of the first section are preferably oriented along a circumferential direction, whereas the slots of the second section are oriented axially relative to the basket. The first section of the basket also smoothes the feed slurry as it impinges on to the basket surface. That is, the first section is configured and arranged to convert the discrete streams of slurry entering the basket into a smooth, continuous annular sheet, thereby facilitating the separation process. A solid wall section within the basket may also be employed at the feed introduction point to improve smoothening of the slurry and reduce wear.

A feed accelerating system may also disposed inside the basket to improve the operating efficiency of the centrifuge. The accelerating system preferably includes a rotating cone accelerator which receives slurry from a feed pipe. The inside surface of the cone accelerator includes a plurality of vanes for accelerating the slurry in a circumferential direction from the small end of the cone, where the feed is introduced, to the large end of the cone where the feed exits. The slurry exits the accelerating cone through passages located at the large diameter end of the cone and is preferably delivered to the basket.

To facilitate the discharge of slurry from the accelerating system, the vanes preferably include a terminal segment mounted along the trailing edge (relative to the direction of rotation) of the passages and extending radially inward. This terminal segment directs the slurry through the respective passage. An overspeeding member, extending outwardly in a generally radial direction from the trailing edge of each passage, may also be provided so as to accelerate the slurry exiting the accelerator system to the tangential velocity of the corresponding introduction point of the basket which is at a larger radius.

The small diameter segment of the basket, which is lined with wear resistant material, assists in smoothening the individual streams or jets of feed exiting the passageways in the cone in order to form a uniformly distributed (e.g., 360 degrees) sheet of slurry on the basket. During this smoothening process, the basket may be subject to substantial wear, especially with abrasive slurries, such as coal. Such potential wear, however, is resisted by the wear resistant material located at the small diameter segment of the basket.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENTS

Figure 1:
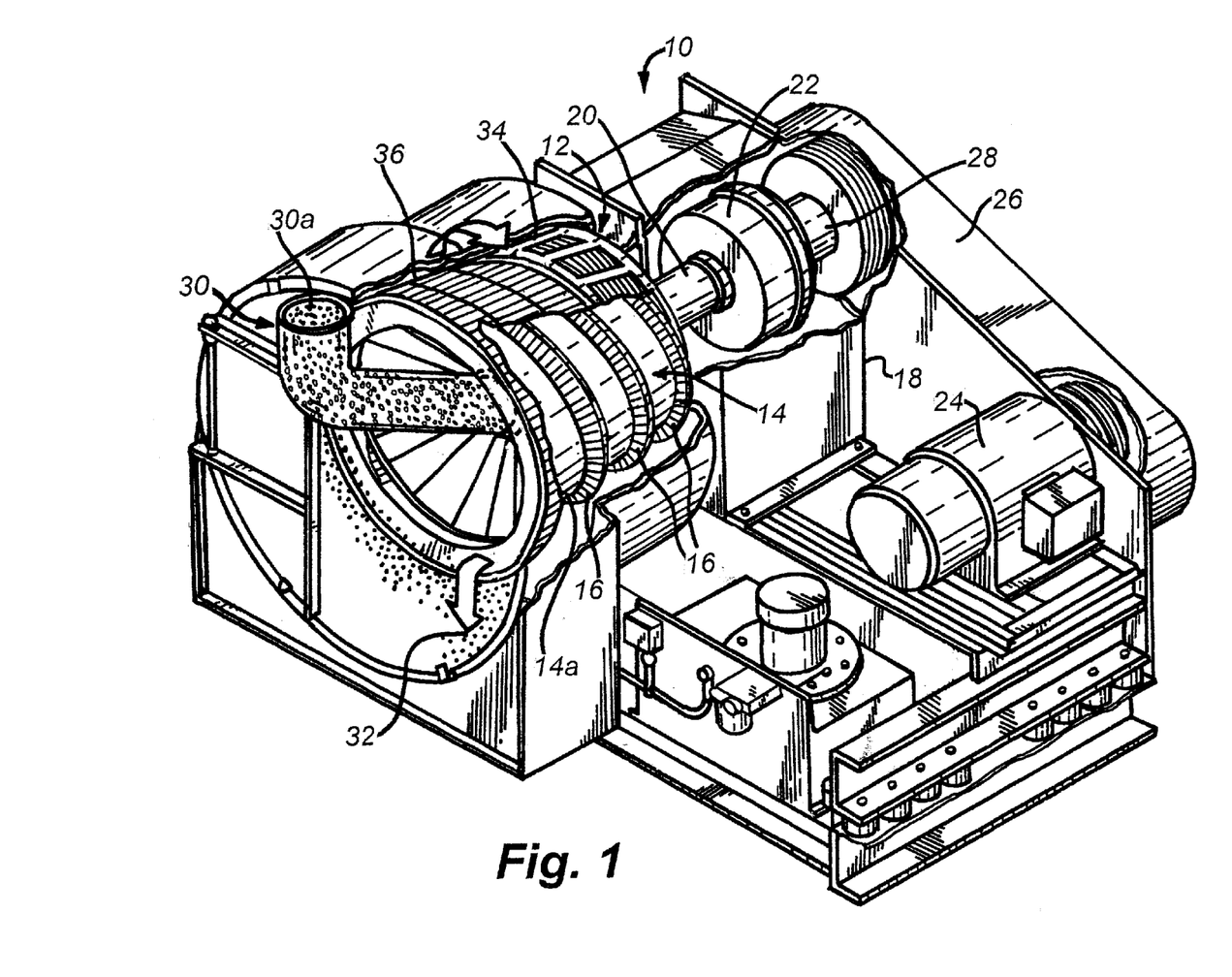
FIG. 1 is a cut-away isometric view of a screen scroll centrifuge in accordance with the present invention.

FIG. 1 is an isometric view of a screen scroll centrifuge 10 having a basket 12. The basket 12, which includes a first section 34 and a second section 36, is partially cut-away to reveal a scroll conveyor 14 concentrically disposed therein. Wrapped around an outer hub 14a of the scroll conveyor 14 is a helical blade 16, that preferably extends along the length of the hub 14a. Centrifuge 10 further includes a pedestal 18 and a shaft 20, which is attached to the basket 12 by conventional means. The shaft 20 is supported by the pedestal 18 through a bearing set (not shown) and is attached to a planetary gear unit 22.

Scroll conveyor 14 is attached to a sleeve shaft (not shown) that extends coaxially into shaft 20. The sleeve shaft is also attached to the planetary gear unit 22. Centrifuge 10 further includes a motor 24 for driving the planetary gear unit 22. In particular, the motor 24 may engage a drive belt 26 that, in turn, rotates a second shaft 28 coupled to the planetary gear unit 22. Motor 24, in conjunction with the planetary gear unit 22, drives the basket 12 and scroll conveyor 14 in the same direction, but at slightly different speeds. In particular, the scroll 14 is connected to an internal spline (not shown) of the gear unit 22 and maintained at a differential speed (faster or slower) relative to the basket 12 by the gear arrangement. In the illustrated embodiment, scroll 14 is driven at a slightly lower speed than basket 12.

Centrifuge 10 further includes a feed pipe 30 which may be attached to pedestal 18 by a support bracket (not shown). The feed pipe 30 includes an inlet 30a which may be attached to a suitable supply of slurry containing both solid and liquid phases that are to be separated by centrifuge 10. Feed pipe 30 preferably delivers slurry to the interior of the scroll conveyor 14. Through differential rotation of the basket 12 and scroll 14, solids, extracted from the slurry through filtration under the centrifugal field, are conveyed along an inner surface of the basket 12, as described below, by helical blade 16 and moved to a discharge outlet 32 where they are collected.

In the illustrated embodiment, the basket 12 is in the form of a truncated cone, thereby defining a small diameter end and a large diameter end. The first section 34 of the basket 12, moreover, is preferably located at the small diameter end, whereas the second section 36 is located at the large diameter end.

Figure 2:
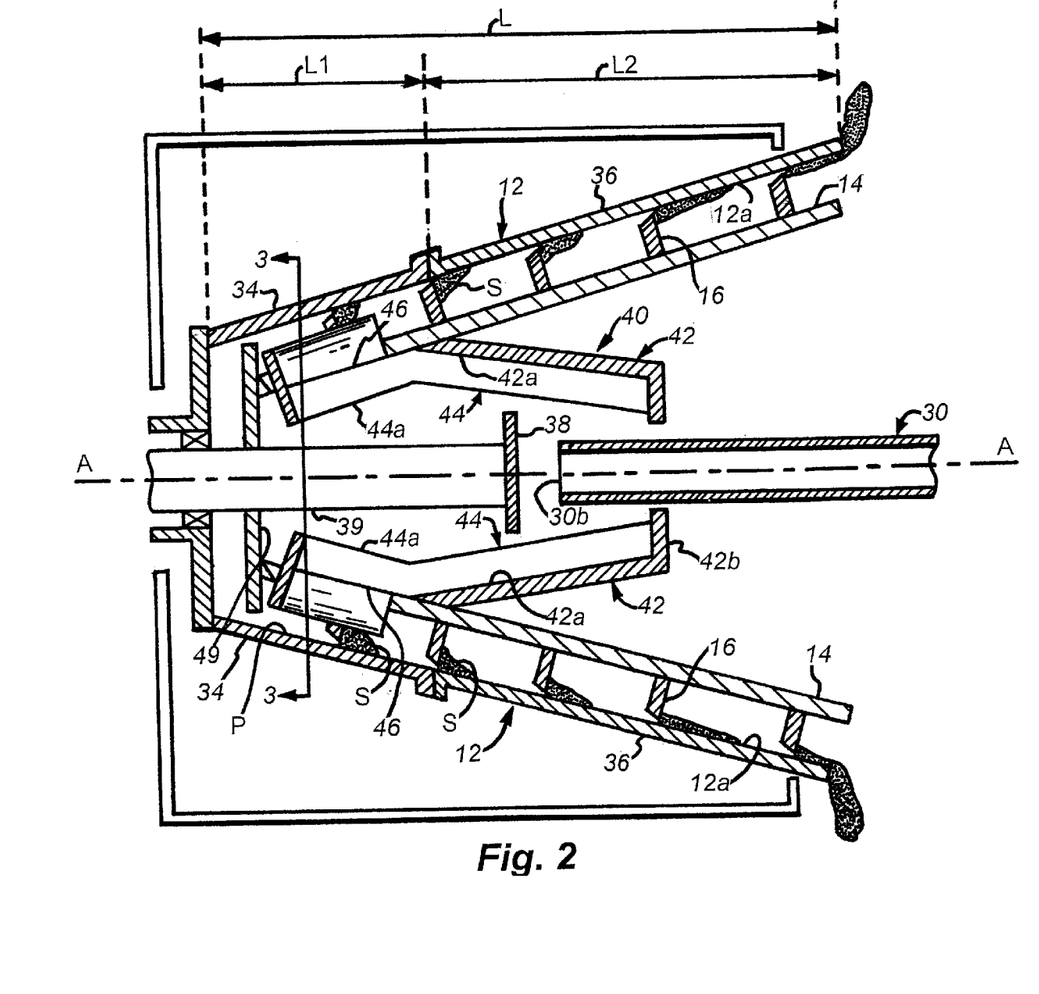
FIG. 2 is a longitudinal cross sectional view of the slurry introduction section of the screen scroll centrifuge of FIG. 1.

FIG. 2 is a cross-sectional view of the slurry introduction section of the centrifuge 10 of FIG. 1. As described above, the scroll conveyor 14 is concentrically disposed inside the basket 12 relative to an axis of rotation A—A. In particular, the scroll 14 is positioned such that the tip of the helical blade 16 runs proximate to an inside surface 12a of the basket 12. The feed pipe 30, moreover, extends into the basket/scroll preferably along axis A—A and includes an outlet 30b. The outlet 30b of the feed pipe 30 is positioned proximate to a target distributor 38 that, in turn, is mounted to a support column 39.

The centrifuge 10 may also include a feed accelerating system designated generally by reference numeral 40. Feed accelerating system 40 may be disposed inside scroll conveyor 14 to accelerate the slurry to the rotational speed of the basket 12. The accelerating system 40 is preferably attached to the scroll 14 and rotates in synchronism therewith. The accelerating system 40 may include a cone accelerator 42 disposed in between the feed pipe 30 and the scroll 14. The cone accelerator 42 has an inside surface 42a to which a series of vanes 44 are attached. Vanes 44 preferably extend in a substantially axial direction along the inside surface 42a of the cone 42 and may project radially therefrom relative to axis of rotation A—A.

Figure 3:
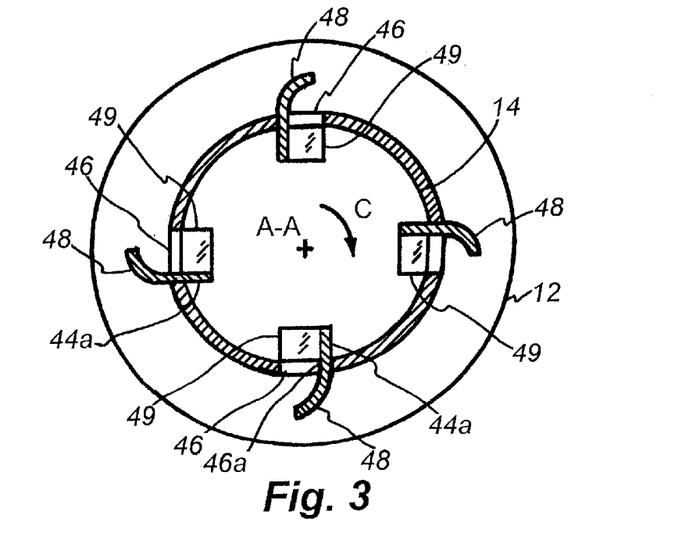
FIG. 3 is an end view of the slurry introduction section of FIG. 2 along lines 3—3.

FIG. 3 is an axial view of the feed introduction section along lines 33 of FIG. 2 with the support column 39 omitted for clarity. Disposed within the scroll conveyor 14 are a plurality of passages 46. Each passage 46 has a trailing edge 46a with respect to the direction of rotation about axis A—A as indicated by arrow C. Vanes 44, moreover, are positioned on the inside surface 42a (FIG. 2) of cone 42 such that a terminal portion 44a of each vane 44 is disposed along the trailing edge 46a of a corresponding passage 46. Extending outwardly from the trailing edge 46a of each passage 46 is an overspeeding member 48. Each overspeeding member is preferably curved in the direction of rotation (arrow C) of the scroll 14 (i.e., forwardly). Mounted orthogonal to the terminal portion 44a of each vane 44 may be an end wall 49 extending along the back edge of the passage 46 adjacent to the corresponding trailing edge 46a. Each end wall 49 may, but need not, extend outwardly from the corresponding passage 46 to substantially the same radial extent as the overspeeding member 48.

It should be understood that any number (e.g., four, eight, etc.) of passages may be provided in the scroll conveyor and/or cone accelerator. The passages, moreover, are preferably rectangular, although they may take any shape.

Figure 4:
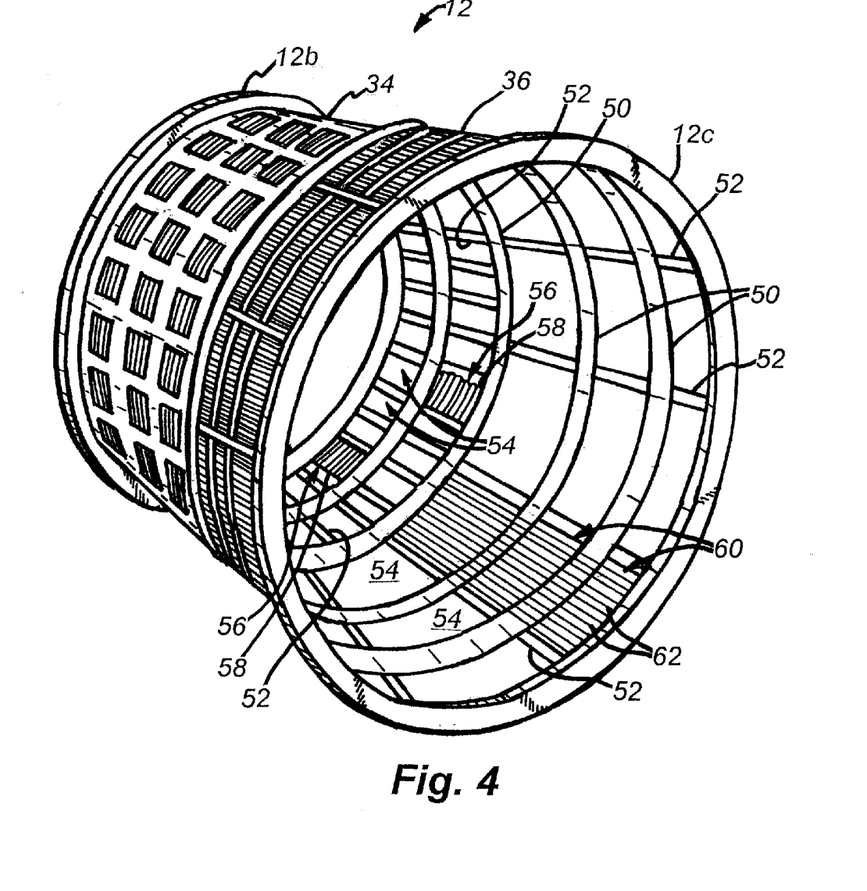
FIG. 4 is a perspective view of the basket of the present invention.

FIG. 4 is a perspective view of the basket 12. As described above, the basket 12 includes a first section 34 that is proximate to a small diameter end 12b and a second section 36 proximate to a large diameter end 12c. Basket 12 is preferably formed from a plurality of spaced-apart circumferential ribs 50 and axial stringers 52. Stringers 52 are preferably attached to the ribs 50 so as to define a plurality of apertures or windows 54 therebetween. Stringers 52 may be placed radially outward from ribs 50 to improve drainage of liquid separated from the slurry.

Bridging each aperture 54 of the first section 34 of basket 12 from the inside is a wear resistant screen element 56. The screen elements 56 may be formed from an arrangement of bars or ligaments 58 made from a wear resistant material, such as tungsten carbide, silicon carbide, ceramic, etc. Bars 58 are preferably configured so that, when arranged side-by-side and end-to-end, they form slots between adjacent bars 58. The slots, moreover, are in fluid communication with the corresponding apertures 54. In the preferred embodiment, in which one or more helical blades 16, that are spaced axially apart, are wrapped continuously around scroll 14, the slots formed by the arrangement of bars 58 in first section 34 are oriented circumferentially relative to basket 12. If a plurality of discrete helical blades 16 are utilized on scroll 14 that do not wrap completely around the hub 14a a full "360" degrees, then the slots of the first section of basket 12 are preferably oriented axially, as described below.

It should be understood that the slots of the first section 34 may be arranged in other patterns and orientations.

A suitable bar or ligament for use in the present invention is disclosed in U.S. Pat. No. 5,378,364, which is hereby incorporated by reference in its entirety. In particular, the bars may be formed from a material, such as tungsten carbide, having an Average Volume Loss range of 0.6 to 3.8 mm under the ASTM G-65 wear test. A silicon-aluminum based ceramic with a 85% or greater alumina content may also be advantageously employed.

Disposed within the second section 36 of basket 12 and bridging the corresponding apertures 54 from the inside are secondary screen elements 60. The secondary screen elements 60 are preferably formed from a plurality of wire members 62 that are arranged side-by-side. In particular, adjacent wire members 62 are spaced slightly apart so as to form channels that are also in fluid communication with the corresponding apertures 54. In the preferred embodiment, the channels formed by the arrangement of wire members 62 extend axially relative to the basket 12. That is, the channels formed in the second section 36 of basket 12 are preferably orthogonal to the slots formed in first section 34. Wire members 62 may be formed from steel or stainless steel wedge or profiled wires.

It should be further understood that the channels of second section 36 may also form any desired pattern or orientation.

Suitable wire members 62 are preferably formed from a material, such as stainless steel wedge wire, having an Average Volume Loss range under the ASTM G-65 wear test that is below the previously specified range for wear resistant bars 58.

With reference to FIGS. 1 and 2, in operation, slurry is provided to centrifuge 10 via feed pipe 30. Slurry exits pipe 30 inside scroll conveyor 14 at outlet 30b and strikes target distributor 38. Target distributor 38 uniformly distributes the slurry onto the inside surface 42a of the cone accelerator 42 of the accelerating system 40. Preferably, the slurry enters the cone accelerator 42 at a small diameter section 42b thereof. Next, the rotating vanes 44 of the cone accelerator 42 contact and accelerate the slurry in a circumferential direction relative to the axis of rotation A—A. Additionally, centrifugal forces generated through rotation of the scroll 14 and cone accelerator 42 drive the slurry toward the passages 46 in scroll 14.

At each passage 46, the terminal portion 44a of the respective vane 44 directs slurry through the corresponding passage 44. That is, terminal portion 44a, being disposed along the trailing edge 46a of the respective passage 46 opposes any forces (e.g., Coriolis forces) that may impede the flow of slurry through the passage, and instead directs the slurry into the passage 46. Overspeeding members 48 further accelerate the slurry exiting the passages 46. Preferably, overspeeding members 48 pre-accelerate the slurry to the local tangential speed of the basket 12 (e.g., at slurry introduction point P (FIG. 2), which is greater than the local tangential speed at the corresponding passage 46 due to the larger radial position of point P. By pre-accelerating the slurry to the local tangential speed of the basket 12, less acceleration is performed by the basket 12. This reduces wear to the basket 12 which otherwise occurs due to slippage, especially of the abrasive slurry over the inside surface 12a of the basket 12 as it is accelerated to the rotational speed of the basket 12.

The slurry exiting scroll conveyor 14 is in discrete streams corresponding to the passages 46. Concentrated streams tend to disrupt the bulk filtration process taking place in the basket 12. Accordingly, the screen elements 56 of the first section 34 of basket 12 are configured and arranged to smooth out the flow of slurry exiting the passages 46. In particular, screen elements 56 are preferably formed from wear resistant bars 58 arranged side-by-side and end-to-end such that the corresponding slots are oriented circumferentially. The wear resistant characteristics of the bars 58 and the orientation of the corresponding slots tend to smear out the discrete streams of slurry from the passages 46 and convert them to a smooth sheet of slurry that is evenly distributed circumferentially around the basket 12. This transition from discrete streams to a wide, smooth sheet facilitates the separation of slurry, in part, by taking advantage of the entire circumference of the basket 12.

Separation of the liquid portion of the slurry begins immediately within basket 12 due, in large part, to the prompt establishment of centrifugal force from efficient acceleration of the slurry by the accelerating system 40. More specifically, the centrifugal forces generated through rotation of accelerating system 40 and basket 12 drive the separated liquid phase of the slurry through the slots of the first section 36. The solid portion or cake S, which comprises particles that are too large to pass through the slots of first section 36, is retained on the inside surface 12a of basket 12. The cake S is then conveyed toward the second section 36 of the basket 12 by the helical blade 16. The two sections 34, 36 of the basket 12, moreover, are preferably smoothly joined together so as to avoid any disruptions to the conveyance of the cake S along the basket 12.

With reference to FIG. 2, basket 12 has an overall length L along the axis that is the sum of a first length L1 corresponding to first section 34 and a second length L2 that corresponds to second section 36. The relationship between L1 and L2 is preferably chosen so that the smoothening and acceleration of the slurry and the removal of the bulk liquid are completed within the first section 34. That is, the slurry is first converted from the discrete streams exiting passages 46 to a smooth, evenly distributed sheet and any further acceleration, which may be necessary to bring the slurry up to the speed of the rotating basket 12, is complete within section 34. Such additional acceleration is achieved by frictional engagement of the slurry with the inside surface 12a of the basket 12.

Once the slurry has been smoothed out and accelerated and a large quantity of liquid removed, further dewatering may be accomplished in section 36 just as efficiently with a less expensive wedge wire section. That is, once these objectives are achieved, basket 12 is subject to much less wear from the cake S. In particular, slippage between abrasive under-accelerated slurry and the inside surface 12a of the basket 12 is the primary source of wear. By the time the semidewatered cake is formed and reaches the second section 36, the wear resistant characteristics of screen elements 56 are no longer as necessary, since the cake is now at the same rotational speed as the basket 12 and thus there is little or no slippage occurring between the cake and the inside surface 12a of the basket 12. That is, the relationship between L1 and L2 are selected so that the greatest amount of potential wear (e.g., slippage) occurs within the first section 34. Accordingly, as described above, the secondary screen elements 60 of second section 36 may be formed from stainless steel wire members 62, rather than the more expensive wear resistant bars 58.

In addition, further dewatering or drying of the cake may take place in the second section 36 using channels that are wider (e.g., greater than 300–400 microns) than the slots of the first section 34 without a significant loss of solid particles. More specifically, when the cake S reaches the second section 36, it is already somewhat dry since a significant amount of liquid was removed during bulk filtration in the first section 34 of basket 12. Accordingly, tiny solid particles present within the slurry are now trapped inside the coarser particles of the cake S, and thereby prevented from passing through the wider channels of the second section 36 of the basket 12. Also, as the solids S are conveyed to a larger radius within section 36 of the basket 12, the corresponding centrifugal forces are higher due to the increased radius in relation to axis A—A. This causes even more liquid to be forced out of the slurry, resulting in a dry cake being discharged from the basket 12.

In the preferred embodiment, the dimensional relationship between the two sections 34 and 36 is one-third/two-thirds. That is, the first section 34 preferably comprises only one-third or less of the entire axial length L of the basket 12, and the second section 36 comprises the remaining two-thirds (i.e., L1 is one-third L and L2 is two-thirds L). This relationship has been determined to achieve the above defined objectives, including sufficient smoothening and acceleration of the slurry and bulk filtration (i.e., the removal of some liquid) within the first section 34. The basket 12, moreover, is preferably at an included angle of 10 to 40 degrees relative to axis A—A.

Utilization of the two-stage basket 12 of the present invention results in a lower cost basket having nearly the same longevity as prior basket designs. Specifically, only one-third of the basket 12 is formed from expensive wear resistant components, significantly reducing the overall manufacturing costs of basket 12. The remaining two-thirds, moreover, may be machine formed, rather than assembled manually. This further reduces the overall costs.

Figure 2A:
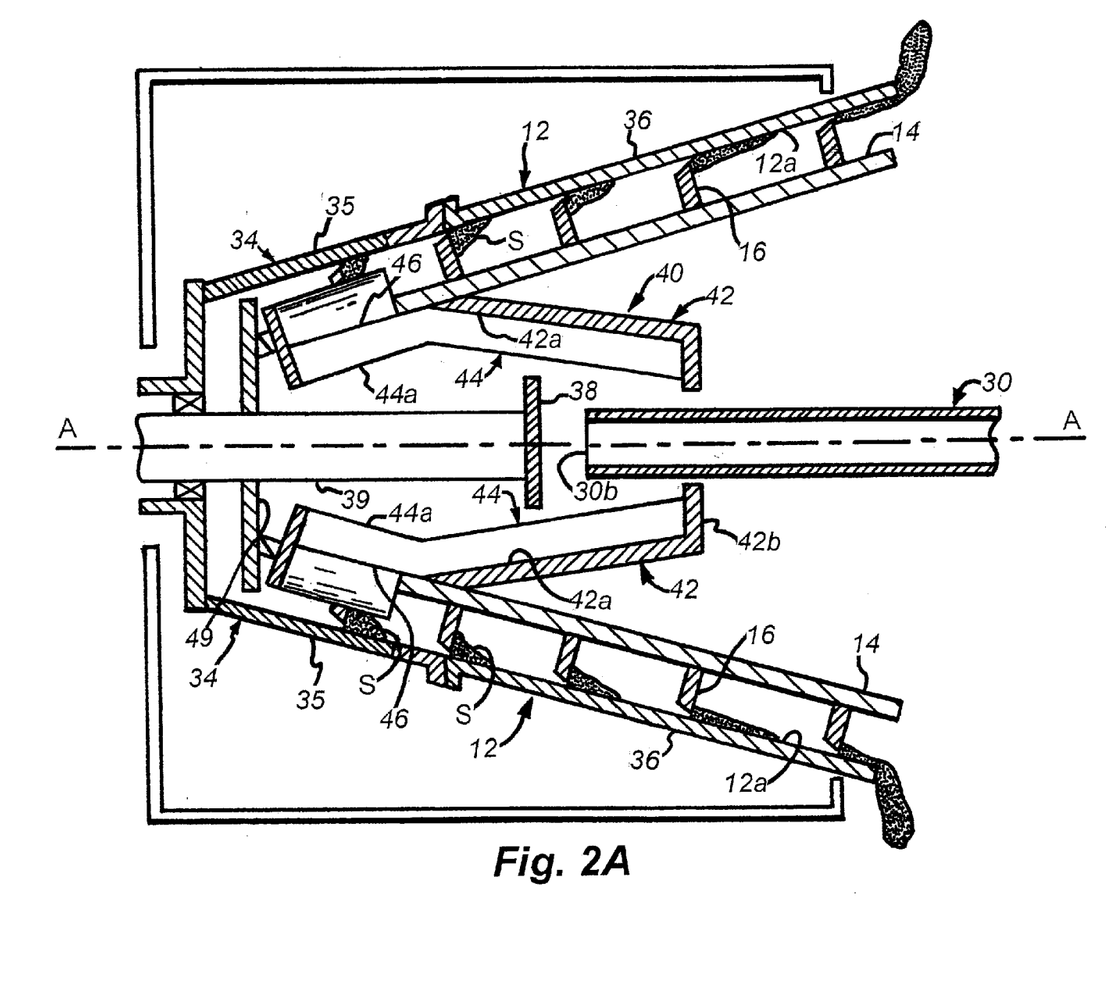
FIG. 2A is a longitudinal cross sectional view of another embodiment of the slurry introduction section of a screen scroll centrifuge.

FIG. 2A is a cross-sectional view of the slurry introduction section of the centrifuge 10 similar to FIG. 2, except that the first several rows of apertures within the first section 34 (where the feed is first introduced) is blinded with a solid wall 35, rather than screened or perforate. The inclusion of the solid wall 35, which is preferably formed from a wear resistant material, provides improved wear resistance characteristics during flow smoothening (i.e., smoothening the discrete streams into a uniform sheet of slurry) while it further prevents loss of fine particles in the filtrate liquid as the cake undergoes bulk filtration and consolidation. As indicated, the solid section 35 of the basket 12 is preferably located at the feed introduction point of the basket 12, which may be positioned at any point within the basket.

It should be understood that the solid wall/wear resistant screen/wedge wire screen sections of the basket 12 may take many different arrangements. For example, as shown in FIG. 2A, the basket may include a solid wall section followed by a wear resistant screen section followed by a wedge wire screen section. Alternatively, the basket may include a solid wall section followed by a either a wear resistant screen or a wedge wire screen section. Another embodiment may include a wear resistant screen section followed by a solid wall section followed by either a wear resistant or a wedge wire screen section.

Figure 5:
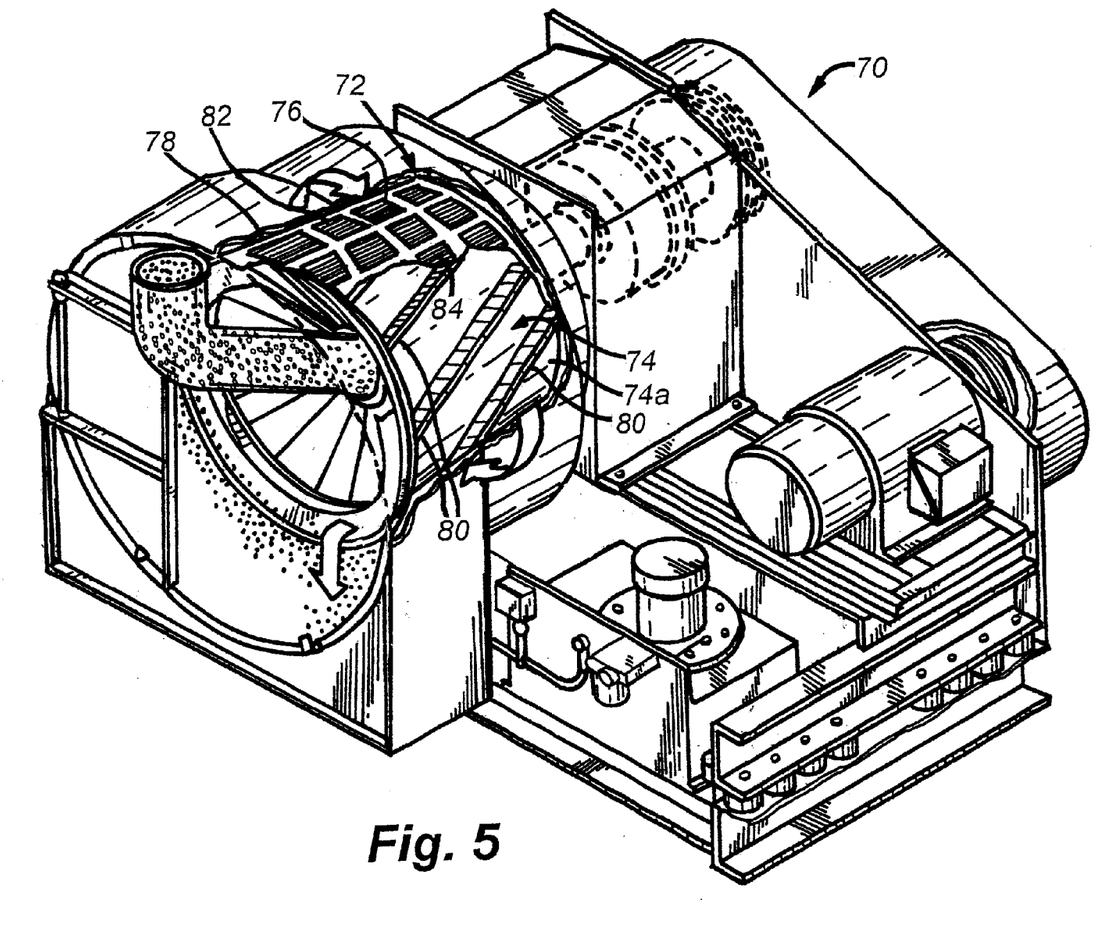
FIG. 5 is a cut-away isometric view of a screen scroll centrifuge including a scroll conveyor having straight blades.

FIG. 5 is an isometric view of a screen scroll centrifuge 70 similar to centrifuge 10 (FIG. 1). Scroll centrifuge 70 includes a two stage basket 72 that is partially cut-away to reveal a scroll conveyor 74. In particular, the basket 72 has a first section 76 and a second section 78. The scroll conveyor 74 also includes an outer hub 74a. Unlike the conveyor 10 of FIG. 1, which includes one or more wrap-around helical blades 16, however, the scroll conveyor 74 of centrifuge 70 includes a plurality of straight blades 80 that are disposed around the outer hub 74a.

Each section 76 and 78 of the basket 72, moreover, includes a plurality of apertures 82. Disposed within or bridging the apertures 82 of the first section 56 of the basket 72 are wear resistant screen elements 84 defining slots. Wear resistant elements 84 are similar to wear resistant screen elements 56 (FIG. 1). The slots of wear resistant screen elements 84, however, are preferably oriented axially relative to the basket 72 and scroll conveyor 74, since the scroll conveyor 74 includes a plurality of straight blades 80 rather than a helical blade(s) wrapped continuously around the scroll as shown in FIG. 1.

Figure 6:
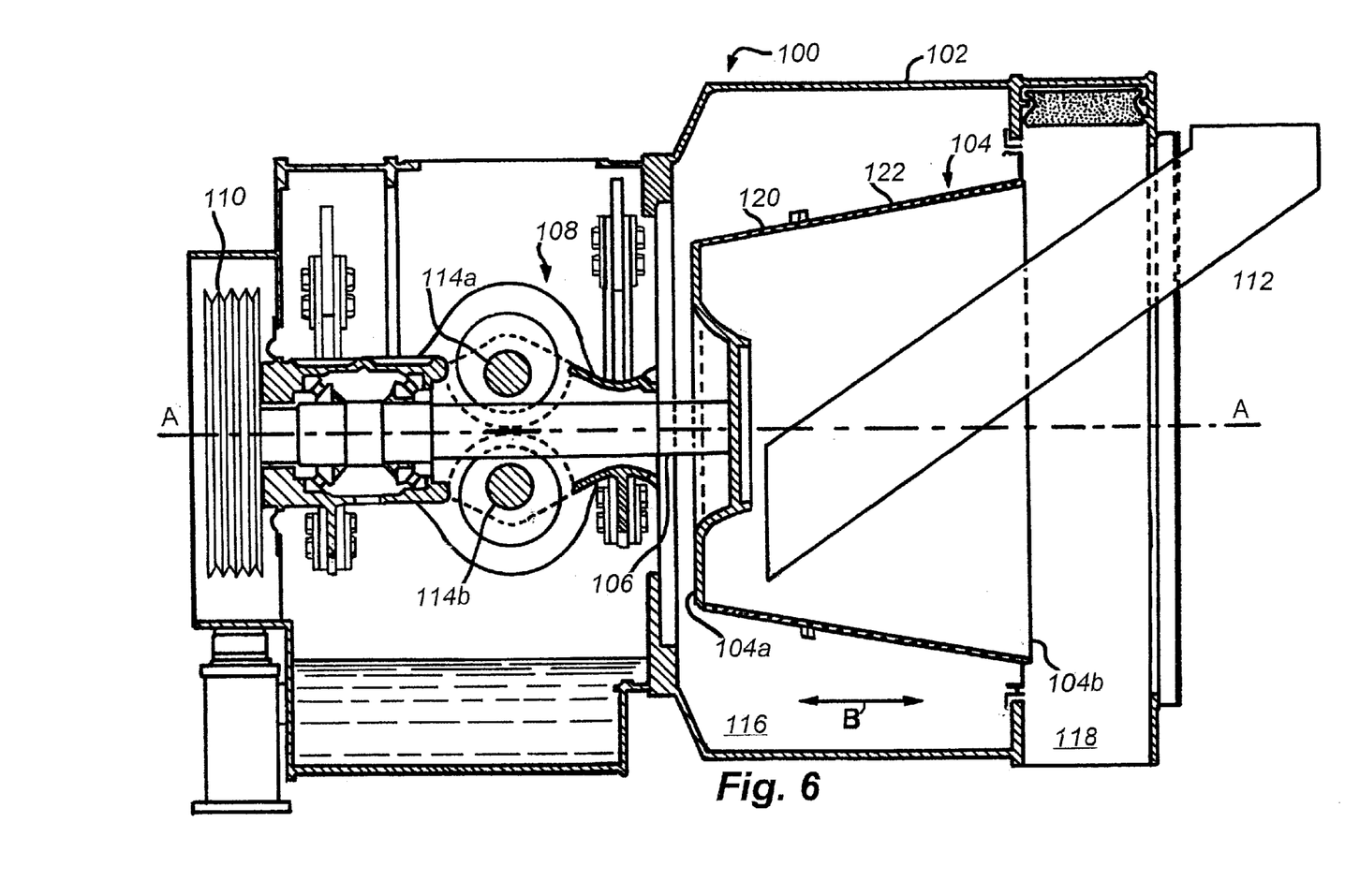
FIG. 6 is a cross-sectional view of a vibrating centrifuge in accordance with the present invention.

FIG. 6 is a cross-sectional view of a vibrating centrifuge 100 having an outer housing 102. Disposed within the outer housing 102 are a basket 104, that rotates about a central axis A—A of the centrifuge 100, and a shaft 106 coupled to the basket 104 for providing rotary power thereto. Also mounted to the shaft 106 is a vibration mechanism 108. Connected to the shaft 106 may be a drive wheel 110 that, in turn, is coupled to a motor (not shown) by suitable means (e.g., a belt drive). The shaft 106, vibrating mechanism 108, and basket 104 may all be supported within the housing 102 by one or more bearing sets (not shown). A feed pipe 112 provides feed slurry to be separated by the vibrating centrifuge 100 to the interior of the basket 104.

The vibration mechanism 108 preferably includes two rotating eccentric weights 114a. 114b. The weights 114a, 114b rotate in synchronism about separate axes that are generally orthogonal to the axis A—A of the centrifuge 100 so as to shake the basket 104 back-and-forth along axis A—A as shown by arrow B. More specifically, as the two eccentric weights 114a, 114b move toward the drive wheel 110, the basket 104 is pulled toward the drive wheel 110. Similarly, when the two weights 114a, 114b move toward the feed pipe 112, the basket 104 is pulled toward the feed pipe 112. The vibration mechanism 108 thus provides a shaking motion to the basket 104.

Similar to the basket of a scroll centrifuge, such as scroll centrifuge 10 (FIG. 1), the basket 104 of the vibrating centrifuge 100 is preferably in the form of a truncated cone, defining a small diameter end 104a and a large diameter 104b. The feed pipe 112, moreover, is preferably disposed so as to deliver feed to the inside surface of the basket 104 at its small diameter end 104a.

In operation, feed to be separated is provided to the inside of the basket 104 from the feed pipe 112. Centrifugal forces generated by high speed rotation of the basket 104 distribute the feed around the inside surface of the basket 104. The liquid phase of the feed filters through the basket 104 as is collected in a liquid collection area 116. The shaking motion of the basket 104, by vibration mechanism 108, causes the solids particles or cake;accumulating on the inside surface of the basket to be solo conveyed toward the large diameter end 104b. A discharge chute 118 positioned at the large diameter end 104b collects the solids or cake portion of the feed.

Conventional vibrating centrifuges, like conventional screen scroll centrifuges are subject to tremendous wear, which significantly increases the costs of operating such centrifuges. Indeed, the point at which the feed first contacts the inside of the basket may be subject to so much abrasion that under accelerated slurry, in the process of being accelerated by the basket, can seriously erode and even punch holes through the basket at this location. Incorporation of the improved basket of the present invention significantly improves the life of the basket without substantially increasing its cost.

In particular, the basket 104 of the vibrating centrifuge 100 preferably includes a first section 120 located proximate to the small diameter end 104a and a second section 122 located proximate to the large diameter end 104b. The basket 104 is preferably formed from a plurality of ribs and stringers (not shown) so as to form a plurality of windows or apertures (not shown) as described in connection with basket 12 (FIG. 4). In addition, disposed within or bridging each aperture of the basket 104 in the first section 120 is a wear resistant screen element (not shown), similar to the wear resistant screen element 56 (FIG. 4). That is, the wear resistant screen elements of basket 104 may be formed from wear resistant bars or ligaments arranged side-by-side and end-to-end so as to form slots. Disposed within or bridging the apertures in the second section 122 of the basket 104 are secondary screen elements (not shown) which are preferably similar to secondary screen elements 60 (FIG. 4).

Figure 7:
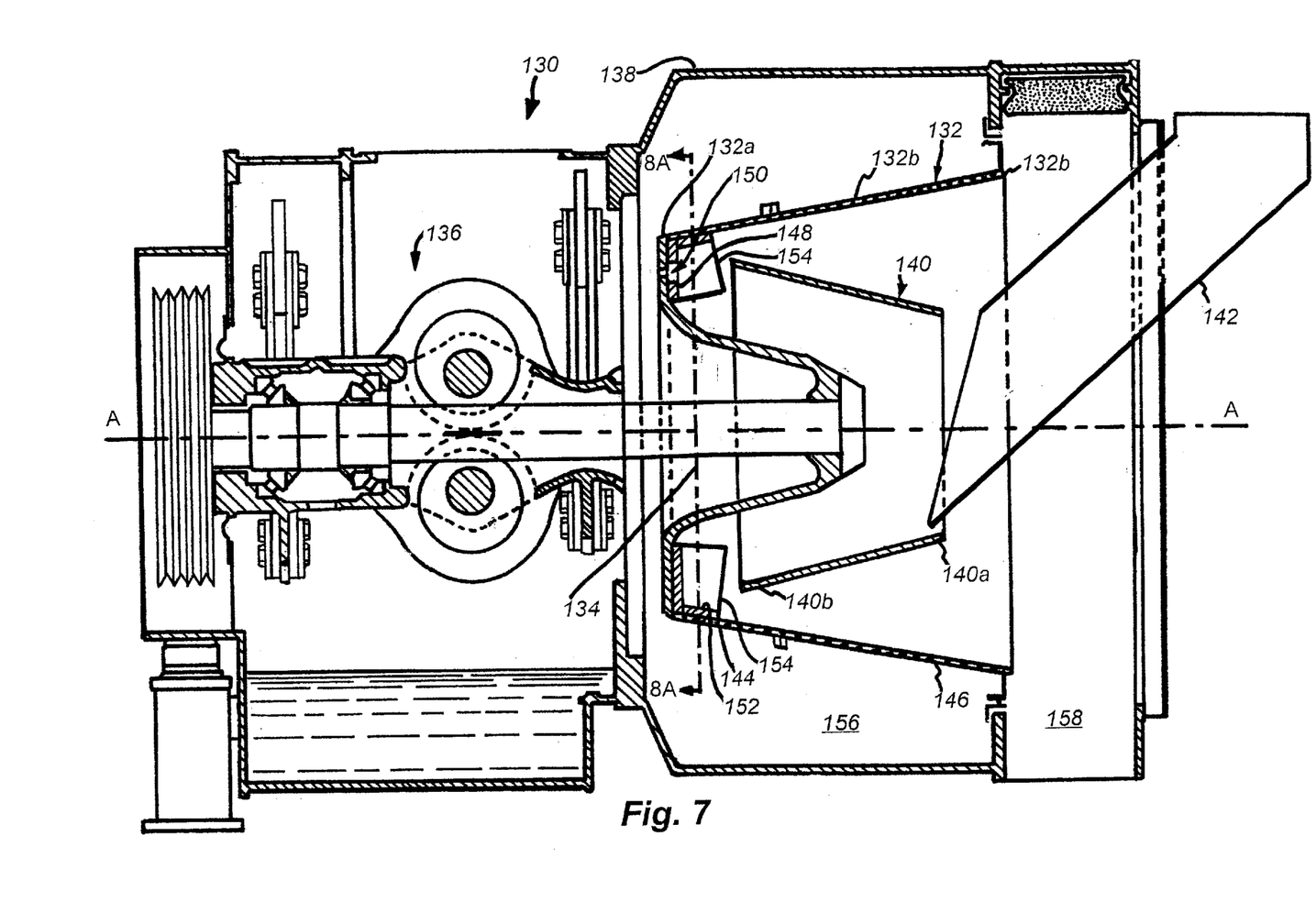
FIG. 7 is a cross-sectional view of a vibrating centrifuge in accordance with another embodiment of the present invention.

FIG. 7 is a cross sectional view of another vibrating centrifuge 130. Vibrating centrifuge 130 similarly includes a basket 132, a shaft 134, and a vibrating mechanism 136, each disposed within an outer housing 138. The basket 132, moreover, has a small diameter end 132a and a large diameter end 132b. Centrifuge 130 further includes a cone accelerator 140 mounted within the basket 132 for accelerating feed received from a feed pipe 142. The cone accelerator 140 also includes a small diameter end 140a and a large diameter end 140b and the feed pipe 142 is preferably positioned to deliver feed to the small diameter end 140a of the cone accelerator 140. The basket 132 and cone accelerator 140 are both coupled to the shaft 134 for rotation about axis A—A.

Similar to the basket 104 of FIG. 6, basket 132 includes a first section 144 located proximate to the small diameter end 132a and a second section 146 located proximate to the large diameter end 132b and is formed from a plurality of ribs and stringers (not shown) so as to define a plurality of windows or apertures (not shown). Within the first section 144, wear resistant screen elements (not shown) bridge the corresponding apertures, while in the second section 146, secondary screen elements (not shown) bridge the corresponding apertures.

Mounted at the small diameter end 132a of the basket is an end plate 148. The end plate 148, which is preferably oriented in a plane generally orthogonal to the axis of rotation A—A, extends around the full circumference of the basket 132 at the small diameter end 132a. That is, the end plate 148 faces the large diameter end 140b of the cone accelerator 140 (i.e., the end from which the feed is discharged). The end plate 148 may be attached to the basket 132 by any conventional fastening means, such as a nut and bolt arrangement 150. Mounted along the inner surface of the basket 132 at the small diameter end 132a is a wear ring 152. The wear ring 152 preferably extends along the inner surface of the basket 132 from the end plate 148 toward the large diameter end 132b of the basket 132. The end plate 148 and the wear ring 152 represent the first contact point for the feed on the basket 132. That is, the feed exiting the cone accelerator 140 preferably first contacts the end plate 148 and the wear ring 152. The wear ring 152, moreover, is preferably solid so that no filtering of liquid occurs as the feed travels axially along the wear ring 152.

In addition to the end plate 148 and the wear ring 152, one or more accelerating vanes 154 may also be mounted proximate to the small diameter end 132a of the basket 132. The accelerating vanes 154 preferably extend in a plane substantially perpendicular to the corresponding point on the inner surface of the basket 132 and orthogonal to both the nominal plane of the end plate 148 and the wear ring 152. The accelerating vanes 154 preferably extend inwardly from the inner surface of the basket 132 toward the axis of rotation A—A and may be at the same height as the end plate 148.

In operation, feed is supplied to the centrifuge 130 by feed pipe 142. The feed enters the small diameter end 140a of the cone accelerator 140 and is accelerated rotationally as it travels axially along the inner surface of the cone accelerator 140. The feed exits the cone accelerator 140 at its large diameter end 140b and engages the basket 132 at the small diameter end 132a. Since the feed first contacts the basket 132 in this area, it is often subject to substantial wear. Nonetheless, both the end plate 148 and the wear ring 152 serve to protect the basket 132 from excess or damaging wear from the abrasive feed. In particular, the feed, as it discharges from the cone accelerator 140, contacts the end plate 148 and wear ring 152 (rather than the inner surface of the basket). The end plate 148 and the wear ring 152 are preferably made of wear resistant material (e.g., tungsten carbide, silicon carbide, ceramic, etc.) and may be quickly and easily replaced when one or both wear out, thereby saving the operator from having to replace the entire basket 132.

The wear ring 152 also further accelerates the feed to the rotational velocity of the basket 132. Since the feed may not be rotating at the same velocity as the basket 132, despite the installation and use of the smooth cone accelerator 140, the feed also causes excessive wear to this initial point of contact with the inner surface of the basket 132.

Utilization of the wear ring 152, however, tends to lessen the amount of wear that would otherwise occur at this point in the basket 132. Since the wear ring 152 presents a solid surface, moreover, it tends to smooth out the flow of feed along the inner surface of the basket 132. Accelerating vanes 54 further assist in bringing the feed up to the rotational velocity of the basket 132. Accordingly, by the time the feed moves off the wear ring 152 and enters the first section 144 of the basket 132 containing the wear resistant screen elements, the feed has been smoothed out and accelerated to the proximate rotational velocity of the basket 132 at the corresponding radial position.

The wear screen elements in the first section 144 of the basket 132 permit at least some of the liquid portion of the feed to be filtered out and collected in a liquid compartment 156 of the centrifuge 130. Next, the feed continues to move axially by operation of the vibrating mechanism 136 and enters the second section 146 of the basket 132. Since the feed is generally at the rotational velocity of the basket 132 by this point, secondary screen elements are preferably utilized in the second section 146, as indicated above, thereby reducing the overall manufacturing and operating costs of the basket 132. As the feed continues to travel axially along the inner surface of the basket 132 toward the large diameter end 132b additional fluid is filtered out resulting in a dry cake that may be collected in a solids chute 158.

Figure 8A:
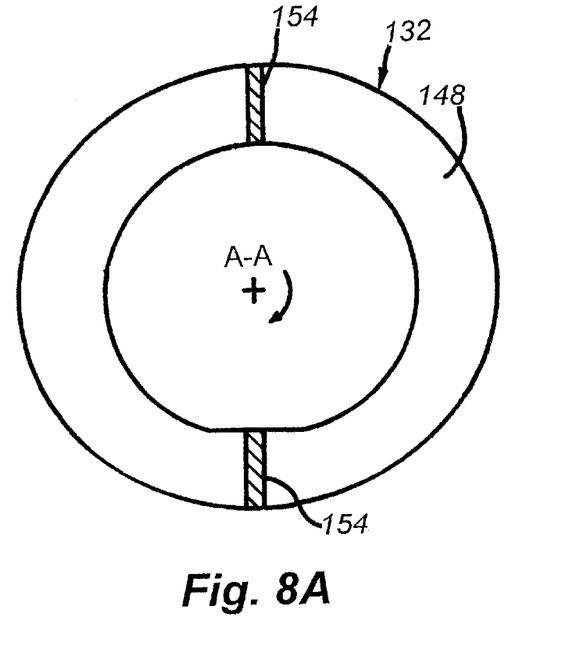
FIGS. 8A–8C illustrate various embodiments of accelerating vanes of the centrifuge of FIG. 7.
Figure 8B:
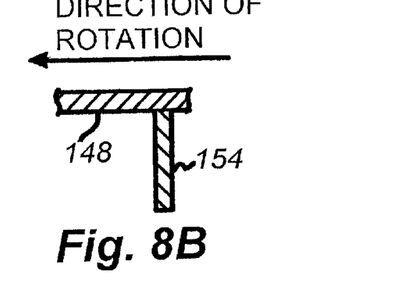
Figure 8C:
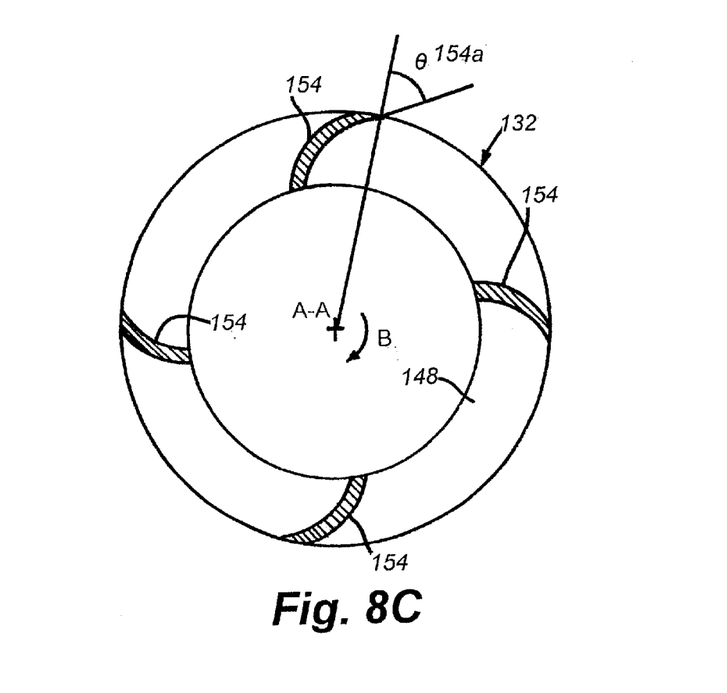

The accelerating vanes 154 may take many different shapes. FIG. 8A is an end view of the basket 132 of FIG. 7 along lines 8A—8A. In this embodiment, the accelerating vane 154 extends perpendicular from the end plate 148. FIG. 8B is a top view of the end plate/accelerating vane combination of FIG. 8A, which more clearly illustrates the relationship. FIG. 8C is also an end view of the basket 132, illustrating another embodiment of the accelerating vane 154. In this embodiment, the accelerating vane 154 is forwardly curved from its small radius end to its large radius end (i.e., curved in the direction of rotation of the basket 132) as shown by arrow B in FIG. 8C. The vane 154 preferably includes a large positive exit angle 154a. This enables the feed to be accelerated to a tangential speed above and beyond that at the local position at the basket. The oversped feed is smoothed out downstream in the unvaned portion 144 of the basket 132 which acts as a smoothener. Therefore, the feed can fully accelerate to speed while it is also uniformly distributed around the circumference of the basket 132.

It should be understood that the accelerating vanes may take other forms and shapes. For example, one or more vanes may include both a straight and a curved section.

Figure 9:
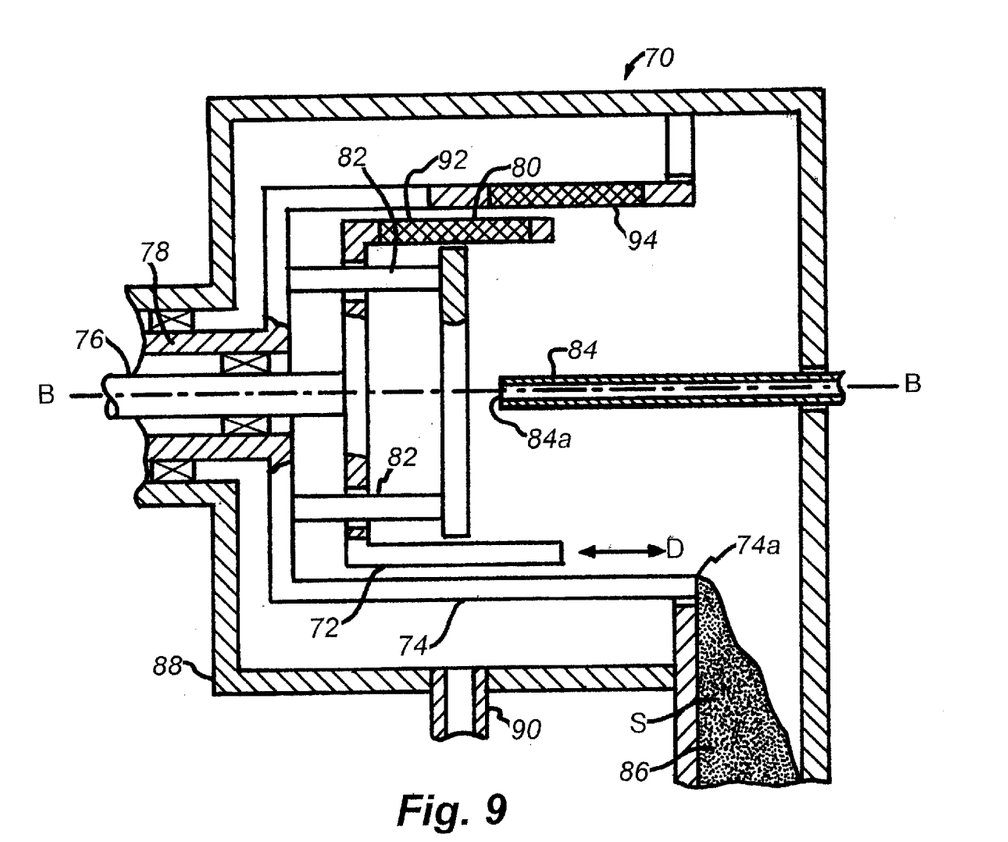
FIG. 9 is a cross-sectional view of a pusher centrifuge in accordance with the present invention.

FIG. 9 is a cross-sectional view of a two-stage pusher centrifuge 70 in accordance with the present invention. The pusher centrifuge 70 has an axis of rotation B—B and includes a rotating and reciprocating first-stage basket 72 that is concentrically disposed within a rotating second-stage basket 74. In particular, first-stage basket 72 is rotatably mounted to a shaft 76 and may be moved axially as shown by arrow D. Second-stage basket 74 is rotatably mounted to a second shaft 78 that is hollow. A rotating but non-reciprocating pusher plate 80 is attached to the second-stage basket 74 by struts 82, which slide relative to reciprocating first-stage basket 72.

A feed pipe 84 for delivering slurry to the centrifuge 70 is centrally disposed therein. Feed pipe 84 includes an outlet 84a that is positioned so as to deliver the slurry to the first-stage basket 72. A solids discharge chute 86 is spaced from an outer edge 74a of the second-stage basket 74 and collects solids S separated by centrifuge 70. The centrifuge 70 also includes a housing 88 in which both baskets 72, 74 are disposed. The housing 88 includes a liquid collection conduit 90.

First-stage basket 72 includes a screen portion 92. Screen portion 92 is preferably formed from an arrangement of wear resistant bars or ligaments. That is, first-stage basket 72, like first section 34 of basket 12 (FIG. 4), preferably includes a plurality of apertures (not shown). Bridging the apertures from the inside are the wear resistant bars or ligaments (not shown). The bars are arranged side-by-side and end-to-end to form slots between adjacent bars, as described above. The slots, moreover, are in fluid communication with the corresponding apertures of the first-stage basket 72 and, in a preferred embodiment, are arranged in a circumferential pattern.

Second-stage basket 74 similarly includes an associated screen portion 94 that is preferably formed from an arrangement of wire elements (not shown). More specifically, second-stage basket 74, like second section 36 of basket 12 (FIG. 4), includes a plurality of apertures (not shown) and the wire elements are preferably arranged side-by-side to bridge the apertures and to form slots between adjacent wire elements. The slots being in fluid communication with the corresponding apertures. In the preferred embodiment, the slots for both the first and second stages 72, 74 are arranged in an axial pattern relative to the axis of rotation B—B so as to reduce resistance to axial cake flow.

It should be understood that centrifuge 70 may also include an accelerator system.

In operation, slurry is provided to the first-stage basket 72 by feed pipe 84. Centrifugal forces generated through rotation of the first-stage basket 72 drive the liquid phase of the slurry through the corresponding screen portion 92. Solid particles are generally too large to fit through screen portion 92 and are thus retained on the inside surface of the first-stage basket 72. Reciprocating movement of the first-stage basket 72 results in the collected solids being periodically pushed out of the first-stage basket 72 and dropped onto the second-stage basket 74 by pusher plate 80.

Further dewatering of the solids takes place at the second-stage basket 74. Here, the slots formed by the wire elements of the second-stage basket 74 may be larger since any small particles remaining in the solids portion are often trapped therein by virtue of the cake being somewhat dried in first-stage basket 72. Furthermore, since the highest potential wear occurs in the first-stage basket 72 due to the smoothening and acceleration of the slurry that occurs therein, it is not necessary that the second-stage basket 74 utilize expensive wear resistant bars or ligaments. Accordingly, as similarly described above, the screen portion 94 of the second-stage basket 74 is preferably formed from wire elements, such as stainless steel wedge wire.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for separating a liquid-solid slurry in a rotating centrifuge having a separation area, the separation area including a first section having an inside surface and a second section, at least a portion of the first section having a wear resistant screen portion and the second section having a wire screen portion, the method comprising the steps of:
   delivering the slurry to the first section of the separation area in a series of streams;
   smoothening out the streams of slurry into an evenly distributed sheet of slurry on the inside surface of the first section through engagement with the wear resistant screen portion of the first section;
   performing bulk filtration of the liquid phase of the slurry in the first section of the separation area so that a solid phase is retained on the inside surface of the first section;
   conveying the solid phase of the slurry retained on the inside surface of the first section to the second section; and
   performing additional filtration of liquid from the solid phase in the second section of the separation area, wherein
      the wear resistant screen portion of the first section defines a plurality of slots that fall within a first size range,
      the wire screen portion of the second section defines a plurality of channels that fall within second size range, and
      the second size range is larger than the first size range.

2. The method of claim 1 wherein the second section constitutes a greater portion of the separation area than the first section.

3. The method of claim 1 wherein the second section constitutes a greater portion of the separation area than the first section.

4. The method of claim 1 wherein
   the separation area has a length in an axial direction,
   the first section extends approximately one-third of the length, and
   the second section extends approximately two-thirds of the length.

5. The method of claim 1 wherein the wear resistant screen portion of the first section includes a plurality of wear resistant elements formed from a material having an average weight loss in the range of 0.6 to 3.8 mm$^3$ under the ASTM G-65 wear test.

6. The method of claim 5 wherein the wire screen portion of the second section includes a plurality of wire members formed from stainless steel.

7. The method of claim 1 wherein the wear resistant screen portion of the first section includes a plurality of wear resistant elements formed from a wear resistant ceramic material.

8. The method of claim 7 wherein the ceramic material is a silicon-aluminum ceramic having an 85% or greater content of alumina.

9. The method of claim 1 wherein the wire screen portion of the second section includes a plurality of wire members formed from stainless steel.

10. The method of claim 1 wherein the first section includes a feed introduction point at which the series of streams of slurry are delivered, the method further comprising the step of blocking filtration of the liquid phase of the slurry at the feed introduction point.

11. The method of claim 10 wherein the step of blocking is performed by placing a solid wall section at the feed introduction point.

12. The method of claim 11 wherein the solid wall section is formed from a wear resistant element.

13. A method for separating a liquid-solid slurry in a rotating centrifuge having a separation area, the separation area including a first section having an inside surface and a second section, at least a portion of the first section having a wear resistant screen portion and the second section having a wire screen portion, the method comprising the steps of:
   delivering the slurry to the first section of the separation area in a series of streams;
   smoothening out the streams of slurry into an evenly distributed sheets of slurry on the inside surface of the first section through engagement with the wear resistant screen portion of the first section;
   performing bulk filtration of the liquid phase of the slurry in the first section of the separation area so that a solid phase is retained on the inside surface of the first section;
   conveying the solid phase of the slurry retained on the inside surface of the first section to the second section; and
   performing additional filtration of liquid from the solid phase in the second section of the separation area, wherein
      the wear resistant screen portion of the first section has a constituent wear resistant property,
      the wire screen portion of the second section has a constituent wear resistant property, and
      the wear resistant property of the wire screen portion is less than the constituent wear resistant property of the first section.

14. The method of claim 13 wherein
   the separation area has an axis about which the first and second sections are disposed, and
   the first section includes a plurality of wear resistant elements configured and arranged so as to define a plurality of circumferentially extending slots relative to the axial direction through which liquid may pass.

15. The method of claim 14 wherein the wire screen portion of the second section includes a plurality of wire members configured and arranged so as to define a plurality of axially extending channels through which liquid may pass.

16. The method of claim 13 wherein the second section includes a plurality of wire members configured and arranged so as to define a plurality of axially extending channels through which liquid may pass.

17. A method for separating a liquid-solid slurry in a centrifuge having a separation area rotatable about an axis, the separation area including a first section having an inside surface and a second section, the first and second sections disposed at different axial positions along the separation area, the method comprising the steps of:
   delivering the slurry to the first section of the separation area in a series of streams;
   smoothening out the streams of slurry into an evenly distributed sheet of slurry on the inside surface of the first section;

conveying the slurry retained on the inside surface of the first section to the second section; and performing filtration on the slurry in the second section of the separation area, thereby separating the liquid from the solid phase, wherein each section defines, for a given area, a fraction open area providing fluid communication, and the fraction open area defined by the first section is different from the fraction open area defined by the second section.

18. The method of claim 17 wherein the first section is solid such that its fraction open area is zero.

19. The method of claim 18 wherein the first section is formed from one of ceramic or tungsten carbide material.

20. The method of claim 17 further comprising the step of performing bulk filtration of the liquid phase of the slurry in the first section of the separation area so that a solid phase is retained on the inside surface of the first section.

21. A method for separating a liquid-solid slurry in a rotating centrifuge having a separation area rotatable about an axis, the separation area including a first section having an inside surface and a second section, the first and second sections disposed at different axial positions along the separation area, the method comprising the steps of:

delivering the slurry to the first section of the separation area in a series of streams;

smoothening out the streams of slurry into an evenly distributed sheet of slurry on the inside surface of the first section;

performing bulk filtration of the liquid phase of the slurry in the first section of the separation area so that a solid phase is retained on the inside surface of the first section;

conveying the slurry retained on the inside surface of the first section to the second section; and performing filtration on the slurry in the second section of the separation area, thereby separating the liquid from the solid phase, wherein the first section defines a plurality of slots that are oriented in a first direction relative to the axis of rotation, the second section defines a plurality of channels that are oriented in a second direction relative to the axis of rotation, and the first direction is different from the second direction.

22. The method of claim 21 wherein the slots of the first section are oriented one of axially and circumferentially.

23. The method of claim 21 wherein the channels of the second section are oriented one of axially and circumferentially.

24. A method for separating a liquid-solid slurry in a rotating centrifuge having a separation area rotatable about an axis, the separation area including a first section having a wear resistant screen portion and an inside surface, and a second section having a wire screen portion, the first and second sections disposed at different axial positions along the separation area, the method comprising the steps of:

delivering the slurry to the first section of the separation area in a series of streams;

smoothening out the streams of slurry into an evenly distributed sheet of slurry on the inside surface of the first section through engagement with the wear resistant screen portion of the first section;

performing bulk filtration of the liquid phase of the slurry in the first section of the separation area so that a solid phase is retained on the inside surface of the first section;

conveying the solid phase of the slurry retained on the inside surface of the first section to the second section; and performing additional filtration of liquid from the solid phase in the second section of the separation area, wherein the wear resistant screen portion of the first section defines a plurality of slots that fall within a first size range, and the wire screen portion of the second section defines a plurality of channels that fall within second size range.

25. A method for separating a liquid-solid slurry in a rotating centrifuge having a separation area rotatable about an axis, the separation area including a first section having a wear resistant screen portion and an inside surface, and a second section having a wire screen portion, the first and second sections disposed at different axial positions along the separation area, the method comprising the steps of:

delivering the slurry to the first section of the separation area in a series of streams;

smoothening out the streams of slurry into an evenly distributed sheet of slurry on the inside surface of the first section through engagement with the wear resistant screen portion of the first section;

performing bulk filtration of the liquid phase of the slurry in the first section of the separation area so that a solid phase is retained on the inside surface of the first section;

conveying the solid phase of the slurry retained on the inside surface of the first section to the second section; and performing additional filtration of liquid from the solid phase in the second section of the separation area, wherein the wear resistant screen portion of the first section is generally cylindrical, and the wire screen portion of the second section is generally conical.

26. A method for separating a liquid-solid slurry in a rotating centrifuge having a separation area rotatable about an axis, the separation area including a first section having a wear resistant screen portion and an inside surface and a second section having a wire screen portion, the first and second sections disposed at different axial positions along the separation area, the method comprising the steps of:

delivering the slurry to the first section of the separation area in a series of streams;

smoothening out the streams of slurry into an evenly distributed sheet of slurry on the inside surface of the first section through engagement with the wear resistant screen portion of the first section;

performing bulk filtration of the liquid phase of the slurry in the first section of the separation area so that a solid phase is retained on the inside surface of the first section;

conveying the solid phase of the slurry retained on the inside surface of the first section to the second section; and performing additional filtration of liquid from the solid phase in the second section of the separation area, wherein the wear resistant screen portion of the first section is generally cylindrical, and the wire screen portion of the second section is generally cylindrical.

* * * * *